US012611362B2

(12) United States Patent
Geyer et al.

(10) Patent No.: US 12,611,362 B2
(45) Date of Patent: Apr. 28, 2026

(54) METHODS AND APPARATUS FOR A NITRIC OXIDE REPLETION SYSTEM

(71) Applicants: Michael J. Geyer, Mesa, AZ (US); Tanner M. Graham, Mesa, AZ (US)

(72) Inventors: Michael J. Geyer, Mesa, AZ (US); Tanner M. Graham, Mesa, AZ (US)

( * ) Notice: Subject to any disclaimer, the term of this patent is extended or adjusted under 35 U.S.C. 154(b) by 664 days.

(21) Appl. No.: 18/155,178

(22) Filed: Jan. 17, 2023

(65) Prior Publication Data

US 2024/0238159 A1 Jul. 18, 2024

(51) Int. Cl.

*A61H 33/14* (2006.01)
*A61H 33/00* (2006.01)
*A61H 33/02* (2006.01)

(52) U.S. Cl.

CPC ........... *A61H 33/14* (2013.01); *A61H 33/026* (2013.01); *A61H 33/6021* (2013.01); *A61H 33/0087* (2013.01); *A61H 2033/146* (2013.01)

(58) Field of Classification Search

CPC .. A61H 33/14; A61H 33/026; A61H 33/6021; A61H 33/0087; A61H 2033/146; A61H 33/02; A61H 33/60; A61H 33/6005; A61M 2202/0275; C02F 2103/42; B01F 23/2375

See application file for complete search history.

(56) References Cited

U.S. PATENT DOCUMENTS

| | | | | | |
|---|---|---|---|---|---|
| 3,111,538 | A * | 11/1963 | Stow, Jr. | C07C 201/02 | 558/486 |
| 5,288,311 | A * | 2/1994 | Furutani | A61H 33/60 | 96/132 |
| 2002/0082566 | A1* | 6/2002 | Stenzler | A61M 35/30 | 604/289 |
| 2008/0170968 | A1* | 7/2008 | Kraus | A61H 33/04 | 422/108 |
| 2010/0311167 | A1* | 12/2010 | Wood | A61K 41/0004 | 435/375 |
| 2016/0183517 | A1* | 6/2016 | Potenziano | A01N 1/143 | 435/1.2 |

FOREIGN PATENT DOCUMENTS

WO WO-2020012131 A1 * 1/2020 ......... A61H 33/6005

* cited by examiner

*Primary Examiner* — Wesley G Harris
(74) *Attorney, Agent, or Firm* — Noblitt & Newson, PLLC

(57) ABSTRACT

A nitric oxide repletion system in accordance with an embodiment of the present technology may disperse therapeutic constituents into a reservoir holding a body of liquid. The nitric oxide repletion system may comprise a reservoir, and a liquid circulation system for generating a fluid flow comprising a pump, a main liquid conduit, a venturi injector, an ultrafine bubble (UFB) generator, a main return, a nitric oxide dispensing system and a mineral dispensing system. The nitric oxide repletion system may further comprise a control panel. In some embodiments, the nitric oxide repletion system may further comprise a gas supply and a gas injector system for supplying a desired gas to the venturi injector or the UFB generator.

15 Claims, 4 Drawing Sheets

METHODS AND APPARATUS FOR A NITRIC OXIDE REPLETION SYSTEM

BACKGROUND OF THE TECHNOLOGY

Normal human physiological plasma concentration of nitrite and nitrate are 0.3 uM-0.5 uM and 20-30 uM concentrations, respectively. Patients with endothelial dysfunction and nitric oxide deficiency have lower concentrations. Clinical studies show that repletion of nitrite and nitrate through oral supplementation can replete and recapitulate nitric oxide based signaling. Nitrite and nitrate can also be absorbed transdermally to reach steady state equilibrium with plasma concentrations. A physiological milieu can be created in a nitric oxide repletion system to allow for simple diffusion of nitrite and nitrate along a concentration gradient to modulate plasma levels of nitrite and nitrate in a human.

SUMMARY OF THE TECHNOLOGY

A nitric oxide repletion system according to various embodiments of the present technology is configured to disperse therapeutic constituents into a reservoir holding a body of liquid. The nitric oxide repletion system may comprise a reservoir, such as a single person spa or tub, and a liquid circulation system comprising a pump, a liquid conduit, a main return, a nitric oxide dispensing system and a mineral dispensing system. The nitric oxide repletion system may further comprise a control panel. In some embodiments, the nitric oxide repletion system may further comprise a gas injector system, a gas supply, a venturi injector, and an ultrafine bubble (UFB) generator. In various embodiments, the nitric oxide repletion system may further comprise a microbubble generator.

BRIEF DESCRIPTION OF THE DRAWINGS

A more complete understanding of the present technology may be derived by referring to the detailed description when considered in connection with the following illustrative figures. In the following figures, like reference numbers refer to similar elements and steps throughout the figures. For simplicity and clarity of illustration, elements in the figures are not necessarily drawn to scale.

DETAILED DESCRIPTION OF THE DRAWINGS

The present technology may be described in terms of functional block components and various processing steps.

Such functional blocks may be realized by any number of components configured to perform the specified functions and achieve the various results. For example, the present technology may employ various types of connectors, couplings, tubing, conduit, valves, regulators, pumps, nozzles, liquid and/or chemical tanks and/or hoppers, and the like, which may carry out a variety of functions. In addition, the present technology may be practiced in conjunction with any number of systems such as residential, commercial, and/or industrial bathing treatment systems and the system described is merely one exemplary application for the technology. Further, the present technology may employ any number of conventional techniques for distributing and/or mixing chemicals, measuring and/or sensing a liquid and/or chemical amount and/or concentration, controlling fluid flow, controlling valves, pumps, coupling valves, conduit, nozzles, regulators, and the like.

Methods and apparatus for a nitric oxide (NO) repletion system according to various aspects of the present technology may operate in conjunction with any suitable aquatic application. Various representative implementations of the present technology may be applied to any bathing, therapeutic, and/or treatment system for a bath or personal spa.

Figure 1:
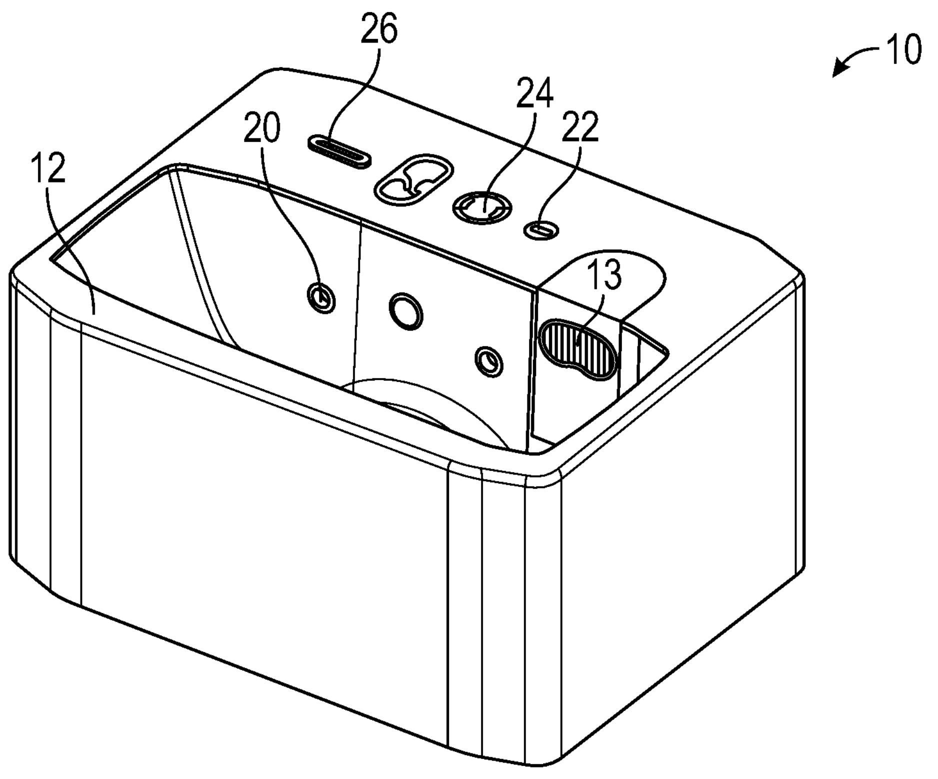
FIG. 1 representatively illustrates a nitric oxide repletion system in accordance with an embodiment of the present technology.
Figure 2:
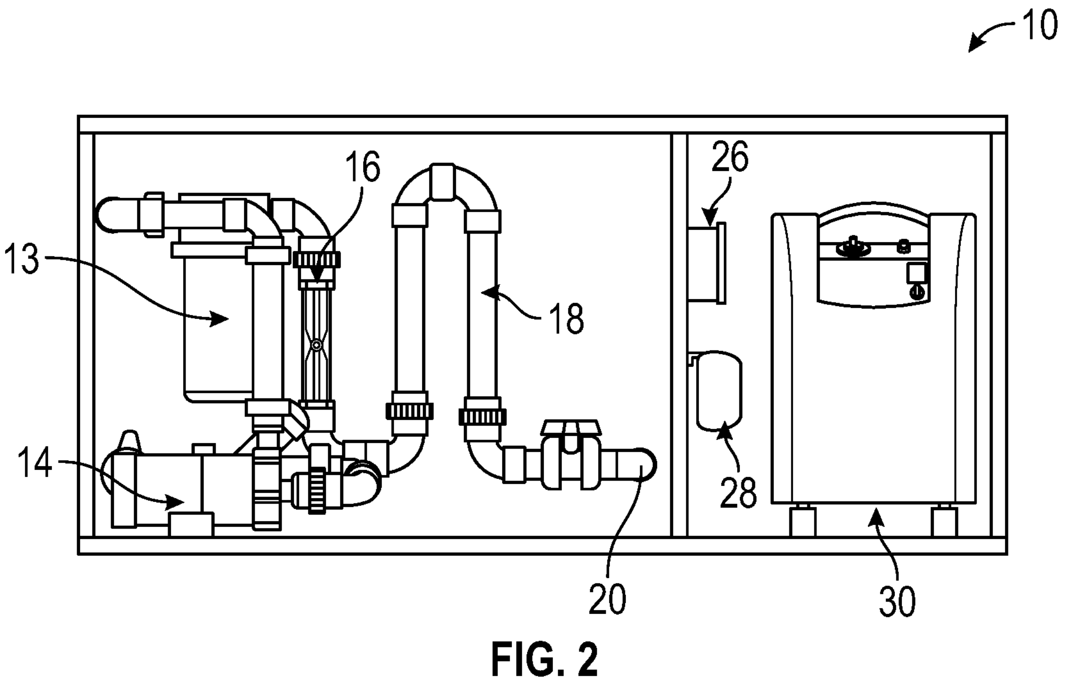
FIG. 2 representatively illustrates a set of internal components of the nitric oxide repletion system in accordance with an embodiment of the present technology.
Figure 3:
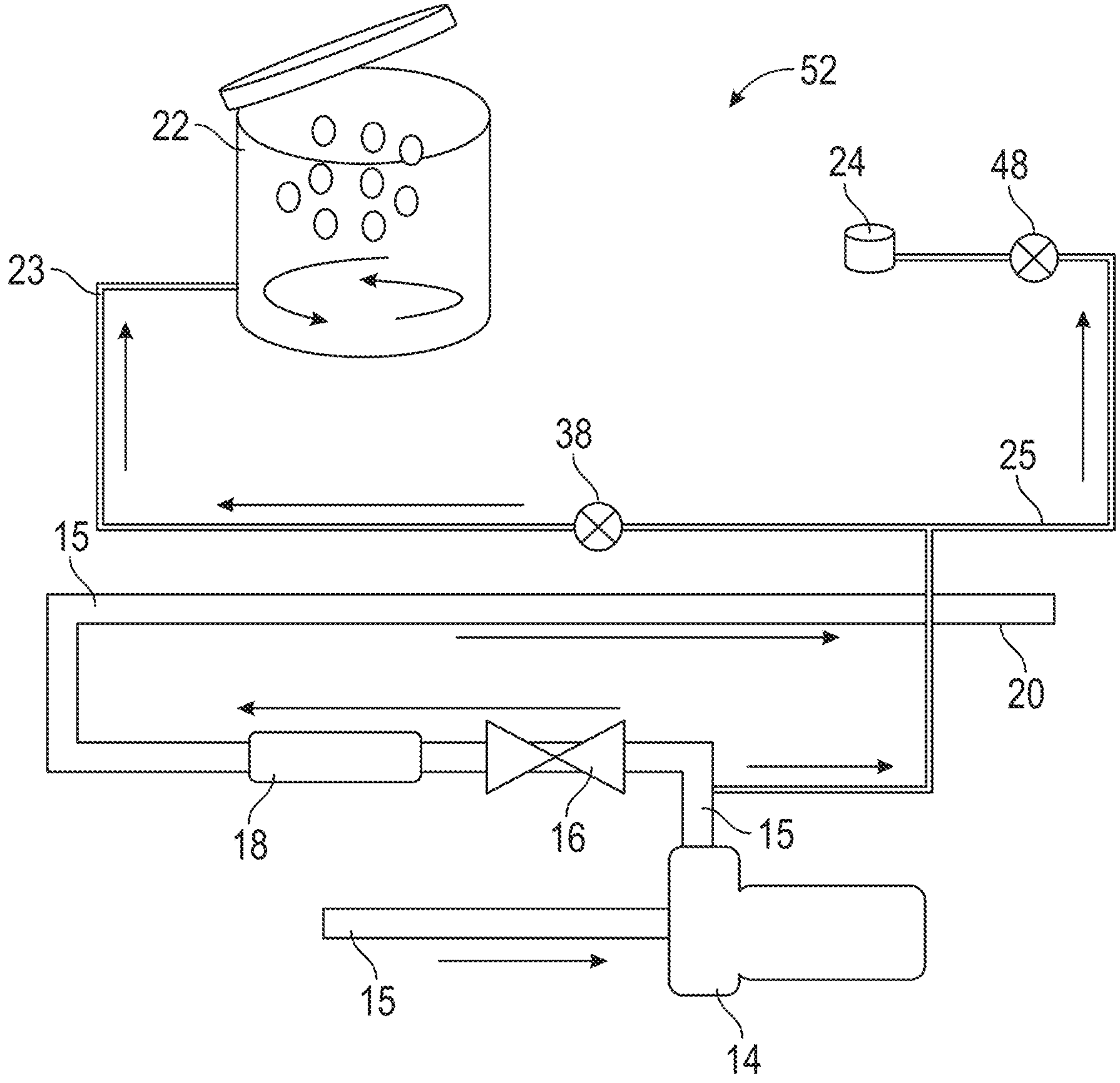
FIG. 3 representatively illustrates a liquid flow path through the nitric oxide repletion system in accordance with an embodiment of the present technology.
Figure 4:
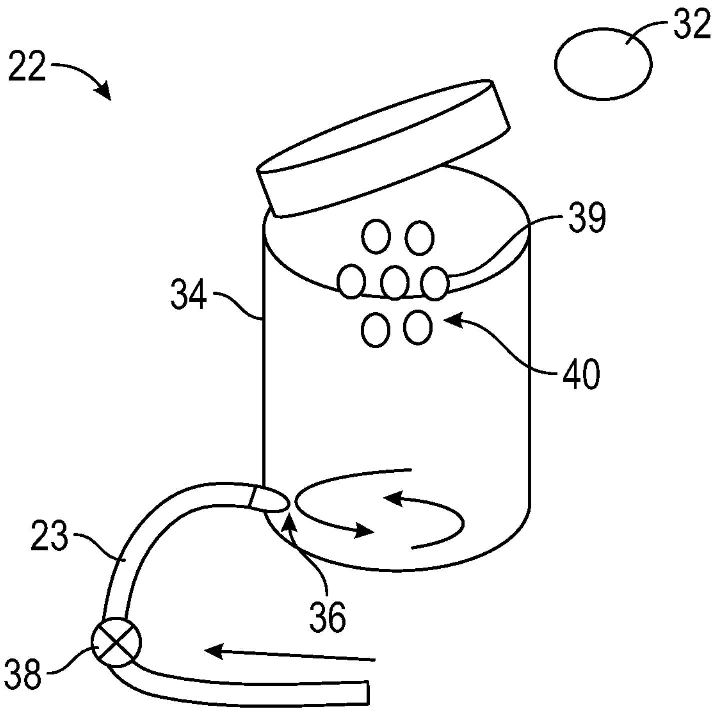
FIG. 4 representatively illustrates a detailed view of a nitric oxide dispensing system in accordance with an embodiment of the present technology.
Figure 5:
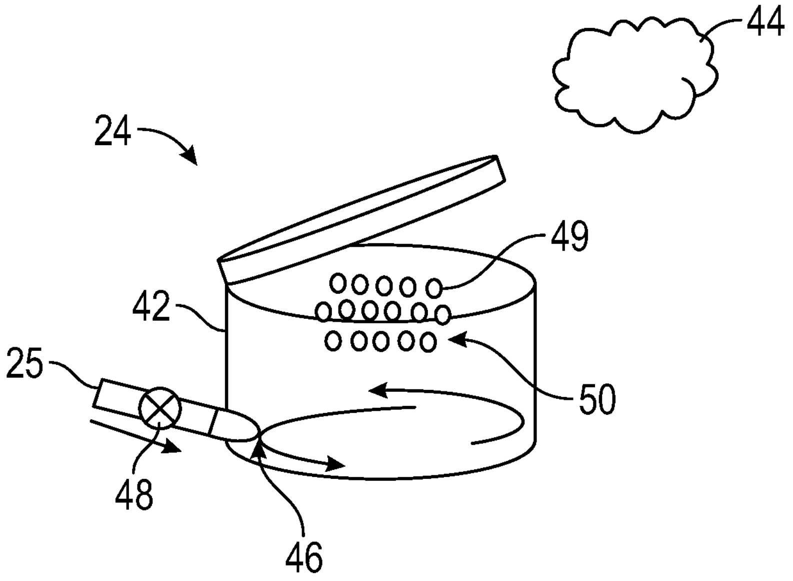
FIG. 5 representatively illustrates a detailed view of a mineral dispensing system in accordance with an embodiment of the present technology.

Referring to FIGS. 1-3, a nitric oxide repletion system 10 in accordance with an embodiment of the present technology may disperse therapeutic constituents into a reservoir holding a body of liquid. The nitric oxide repletion system 10 may comprise a reservoir 12, and a liquid circulation system 52 for generating a fluid flow comprising a pump 14, a main liquid conduit 15, a venturi injector 16, ultrafine bubble (UFB) generator 18, a main return 20, a nitric oxide dispensing system 22 and a mineral dispensing system 24. The nitric oxide repletion system 10 may further comprise a control panel 26. In some embodiments, the nitric oxide repletion system 10 may further comprise a gas supply 30 and a gas injector system 28 for supplying a desired gas to the venturi injector 16 or the UFB generator 18.

The reservoir 12 may comprise any suitable apparatus for holding a body of liquid (e.g., water) such as a single or multi-person tub, therapeutic bath, spa, tank, or the like. The reservoir 12 may comprise any suitable size and shape to fit at least a part of a body. The reservoir 12 may comprise any suitable total volume. For example, in some embodiments, the reservoir 12 may be sized to hold a total volume of between about 200 L and about 850 L (approximately 53-225 gallons). In various embodiments, the main return 20 of the reservoir 12 may comprise direct flow jets or outlet jets similar to a jetted tub or hot tub. In other embodiments, the main return 20 may comprise a single inlet.

Referring now to FIG. 3, the liquid circulation system 52 comprises a plurality of liquid conduits: a main liquid conduit 15, a second liquid conduit 23 and a third liquid conduit 25. In various embodiments, a main flow of the liquid flows through the main liquid conduit 15 before branching into two additional sections downstream of the pump 14 and upstream of the venturi injector 16. A second liquid conduit 23 directs a second portion of the main flow to the nitric oxide dispensing system 22 and a third liquid conduit 25 directs a third portion of the main flow to the mineral dispensing system 24. The remaining portion of the fluid flow remains in the main liquid conduit 15 and is directed towards the venturi injector 16.

The main liquid conduit 15 is fluidly connected to the reservoir 12 by a main inlet 13 and positioned upstream of the pump 14. The main liquid conduit 15 facilitates circulation of the liquid from the reservoir 12 to the pump 14, venturi injector 16, and UFB generator 18 back to the reservoir 12. The main liquid conduit 15 may comprise any suitable system for allowing a flow of liquid through the liquid circulation system 52 of the nitric oxide repletion system 10. The main liquid conduit 15 may be any suitable size based on the size and type of components of the nitric oxide repletion system 10, the pressure and/or flow requirements for the liquid flowing into and/or out of the nitric oxide repletion system 10, or any other relevant factor.

The pump 14 facilitates flow of the liquid from the reservoir 12 through the various components of the nitric oxide repletion system 10 and back into the reservoir 12. The pump 14 may comprise any suitable system or device configured to circulate liquid through the nitric oxide repletion system 10. For example, the pump 14 may be configured to receive water from the reservoir 12 via the main liquid conduit 15 and generate a sufficient flow rate of water through the various components of the liquid circulation system 30 and back into the reservoir 12. The pump 14 may comprise any suitable size and may be selected according to any suitable criteria such as desired application, desired flow rate, operating pressure, source of liquid, or function. For example, the pump 14 may comprise an electrical pump powered by an external power supply and be configured to provide a specific output power, fixed or adjustable flow rate, or other suitable criteria.

The venturi injector 16 is configured to receive a flow of liquid from the pump 14 and to receive a concentrated gas from the gas supply 30 that is configured to supply gas to the gas injector system 28. The venturi injector 16 may comprise a first inlet, a second inlet, and an outlet. For example, the first inlet may be connected to the pump 14 via the main liquid conduit 15 and configured to receive the liquid. The second inlet may be connected to the gas injector system 28 to receive one or more gasses. The venturi injector 16 outlet may be connected to the main liquid conduit 15 to allow flow of the liquid to continue to the UFB generator 18. The venturi injector 16 may comprise any suitable type of device for drawing gas into the liquid flow. For example, the venturi injector 16 may comprise a conventional venturi valve configured to create a suction effect to pull a gas from the gas injector system 28 into the second inlet. The venturi injector 16 may be constructed of any suitable material and may be of any suitable size based on the size and type of components of the nitric oxide repletion system 10, the pressure and/or flow requirements for the liquid flowing into and/or out of the nitric oxide repletion system 10, or any other relevant factor.

The gas supply 30 provides an external source of a gas to the gas injector system 28. The gas supply 30 may also be configured to generate a desired gas from the ambient air supply. The gas supply 30 may comprise any suitable concentrated gas and/or pressurized gas. For example, the gas supply 30 may generate oxygen gas and/or ozone gas from ambient air and provide the generated gas to the gas injector system 28.

The gas injector system 28 injects the gas from the gas supply 30 into the liquid flowing through the venturi injector 16. The gas injector system 28 may comprise any suitable type of device for injecting gas into the liquid. The gas injector system 28 may be selected according to any suitable criteria such as a desired output power, the size and type of components of the nitric oxide repletion system 10, the pressure and/or flow requirements for the liquid flowing into and/or out of the nitric oxide repletion system 10, or any other relevant factor.

In some embodiments, the nitric oxide repletion system 10 may further comprise a microbubble generator (not shown). The microbubble generator may be configured to generate microbubbles to produce oxygen and ozone-infused water. The microbubble generator may comprise any suitable type of device for producing microbubbles of any suitable size. For example, the gas injector system 28 may be configured to generate microbubbles in the range from 0.2 μm to 100 μm in diameter. The microbubble generator may be selected according to any suitable criteria such as a desired output power, the size and type of components of the nitric oxide repletion system 10, the pressure and/or flow requirements for the liquid flowing into and/or out of the nitric oxide repletion system 10, or any other relevant factor.

The ultrafine bubble (UFB) generator 18 is configured to receive the gas-infused first portion of the flow of liquid from the venturi injector 16. The UFB generator 18 may be configured to generate ultrafine bubbles to produce oxygen-infused and/or ozone-infused water. The UFB generator 18 may comprise any suitable type of device for producing ultrafine bubbles of any suitable size. For example, the UFB generator 18 may be configured to generate ultrafine bubbles of less than 0.2 μm in diameter. The UFB generator 18 may be selected according to any suitable criteria such as a desired output power, the size and type of components of the nitric oxide repletion system 10, the pressure and/or flow requirements for the liquid flowing into and/or out of the nitric oxide repletion system 10, or any other relevant factor.

The nitric oxide dispensing system 22 is configured to dispense a nitric oxide releasing composition 32 into the second portion of the liquid flowing from the pump 14 via the second liquid conduit 23 located downstream of the pump 14 into the reservoir 12. In one embodiment, the nitric oxide dispensing system 22 comprises a compartment 34 for receiving the nitric oxide releasing composition 32, an inlet 36 for receiving the second portion of the liquid from the second liquid conduit 23 into the compartment 34, a valve 38 coupled downstream from the inlet 36 for regulating an incoming flow of the second portion of the liquid and at least one outlet 39 for expelling the nitric oxide infused liquid into the reservoir 12.

The at least one outlet 39 may comprise one or more holes 40 disposed along any portion of the compartment 34 in fluid communication with the reservoir 12. For example, in one embodiment, the holes 40 may be positioned on a portion of the compartment 34 to facilitate flow of the liquid from the nitric oxide composition 32 to the reservoir 12. The holes 40 may comprise any suitable shape and size, such has horizontal slits, circular cutouts, or any other shape and size which allows liquid to flow out of the interior of the compartment 34. In some embodiments, the nitric oxide dispensing system 22 may comprise a series of jets (not shown) configured to inject the nitric oxide under pressure into the reservoir 12.

The nitric oxide releasing composition 32 may comprise any suitable composition that may release nitric oxide when combined with an aqueous solution. The nitric oxide releasing composition 32 may comprise any suitable form for dispersing into a reservoir holding a body of liquid. For example, in some embodiments, the nitric oxide releasing composition 32 may be in the form of a gas, solid or liquid. The nitric oxide may comprise any suitable concentration or particle size. The nitric oxide releasing composition 32 may be packaged in any suitable form for dispensing nitric oxide into a reservoir. For example, in some embodiments, the nitric oxide releasing composition 32 may be packaged in a bag, pellet or a powder.

The mineral dispensing system 24 is configured to dispense a mineral releasing composition 44 into a third portion of the liquid flowing from the pump 14 via a third liquid conduit 25. In one embodiment, the mineral dispensing system 24 comprises a second compartment 42 for receiving a mineral releasing composition 44, a second inlet 46 for receiving the third portion of the liquid from the third liquid conduit 25 from the pump 14 into the second compartment 42; a second valve 48 coupled downstream from the second inlet 46 for regulating an incoming flow of the third portion of the liquid; and at least one second outlet 49 for expelling the mineral infused liquid into the reservoir 12.

The at least one second outlet 49 may comprise one or more holes 50 disposed along any portion of the second compartment 42 in fluid communication with the reservoir 12. For example, in one embodiment, the holes 50 may be positioned on a portion of the second compartment 42 to facilitate flow of the liquid from the mineral composition 44 to the reservoir 12. The holes 50 may comprise any suitable shape and size, such has horizontal slits, circular cutouts, or any other shape and size which allows liquid to flow out of the interior of the second compartment 42. In some embodiments, the mineral dispensing system 24 may comprise a series of jets (not shown) configured to inject the mineral under pressure into the reservoir 12.

The mineral releasing composition 44 may comprise any suitable composition that may release mineral when combined with an aqueous solution. The mineral releasing composition 44 may comprise any suitable form for dispersing into a reservoir holding a body of liquid. For example, in some embodiments, the mineral releasing composition 44 may be in the form of a gas, solid or liquid. The mineral may comprise any suitable mineral, concentration or particle size. The mineral releasing composition 44 may be packaged in any suitable form for dispensing mineral into a reservoir. For example, in some embodiments, the mineral releasing composition 44 may be packaged as a bag, pellet or a powder. In some embodiments, the valve 38 of the nitric oxide dispensing system 22 and the second valve 48 of the mineral dispensing system 24 may comprise automatic shutoff valves. For example, the automatic shutoff valve may be configured to automatically activating or deactivating the valve 38 of the nitric oxide dispensing system 22 or the second valve 48 of the mineral dispensing system 24 to maintain a desired level and/or composition of nitric oxide/minerals in the reservoir 12. The valves 38, 48 may also be responsive to signals from the control panel 26 such that are configured to open or close according to commands from the control panel 26. In yet another embodiment, the valves 38, 48 may be manually operated.

The nitric oxide repletion system 10 may further comprise a control panel 26 to operate various components of the nitric oxide repletion system 10. The control panel 26 may be located on an outside surface of the reservoir 12 for easy access to control operation of the nitric oxide repletion system 10. The control panel 26 may comprise any suitable device or system required to operate the various components of the nitric oxide repletion system 10.

In various embodiments, the control panel 26 may further comprise a system for monitoring, detecting and quantify levels of nitric oxide and/or minerals in the liquid. For example, the monitoring system may comprise any suitable sensors or other detection mechanism. In some embodiments, the control system 26 may comprise a system for automatically activating or deactivating the valve 38 of the nitric oxide dispensing system 22 or the second valve 48 of the mineral dispensing system 24 to maintain a desired level and/or composition of nitric oxide/minerals in the reservoir 12.

Referring to FIGS. 1-6, in operation, the nitric oxide repletion system 10 pumps liquid from a liquid source, dispenses nitric oxide and/or minerals into the liquid, and returns the nitric oxide and mineral diffused water back into the liquid source. The liquid from the liquid source may be cycled through the nitric oxide repletion system 10 at any time at a user's discretion, or may be set to cycle at set times. For example, the user may want to manually turn on the system for a period of time, or the user may set the nitric oxide repletion system 10 to cycle.

Figure 6:
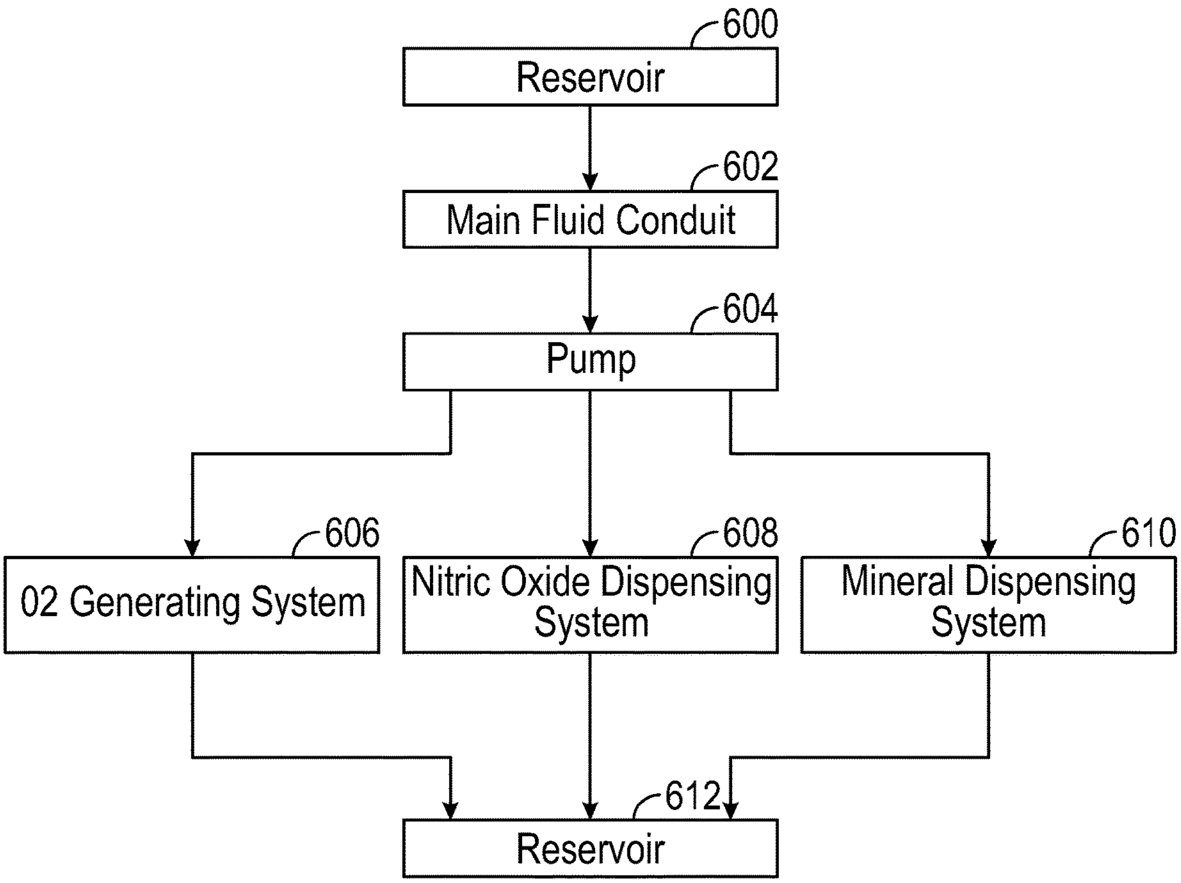
FIG. 6 representatively illustrates a liquid circulation system in operation in accordance with an embodiment of the present technology.

Referring to FIG. 6, in one embodiment, the main liquid conduit 15 (602) facilitates circulation of the liquid from the reservoir 12 (600) to the pump 14 (604). The pump 14 facilitates circulation of a first flow of liquid to the venturi injector 16 and UFB generator 18 (606) back to the reservoir 12 (612). The main liquid conduit 15 branches into two components downstream of the pump 14 and upstream of the venturi injector 16: a second liquid conduit 23 and a third liquid conduit 25. The second liquid conduit 23 directs a second flow of liquid through the nitric oxide dispensing system 22 (608) back to the reservoir (612). The third liquid conduit 25 directs a third flow of liquid through the mineral dispensing system 24 (610) back to the reservoir 12 (612).

As will be understood by one of ordinary skill in the art, the various components of the nitric oxide repletion system 10, such as the various valves, nozzles, regulators, and the like, may be coupled together directly or indirectly. Any suitable conduit may be used to indirectly couple the various components. As will also be understood by one of ordinary skill in the art, the various components, while discussed separately, may be embodied as single systems performing the functions of one or more of the described components. For example, the pump 14 may comprise a system that performs the functions of pumping the flow of liquid.

As will also be understood by one of ordinary skill in the art, the various components, including any conduit, of the nitric oxide repletion system 10 may be sized based on any number of factors, including flow rate and/or pressure requirements of a system the nitric oxide repletion system 10, is configured to couple to, the volume of liquid required to be output from the nitric oxide repletion system 10, mechanical tolerances and limits of the various components themselves, the liquids and/or secondary chemicals used in the nitric oxide repletion system 10, and the like. Similarly, one of ordinary skill in the art will understand that the various components of the nitric oxide repletion system 10 may be made from any suitable material, for example copper, PVC, brass, and the like, and the choice of material may depend on the particular application of the nitric oxide repletion system 10. Relevant regulations and standards, such as those promulgated by NSF International, may also affect the choice of size, material, and the like, for the various components of the nitric oxide repletion system 10.

The particular implementations shown and described are illustrative of the technology and its best mode and are not intended to otherwise limit the scope of the present technology in any way. Indeed, for the sake of brevity, conventional manufacturing, connection, preparation, and other functional aspects of the system may not be described in detail. Furthermore, the connecting lines shown in the various figures are intended to represent exemplary functional relationships and/or steps between the various elements. Many alternative or additional functional relationships or physical connections may be present in a practical system.

In the foregoing description, the technology has been described with reference to specific exemplary embodiments. Various modifications and changes may be made, however, without departing from the scope of the present technology as set forth. The description and figures are to be regarded in an illustrative manner, rather than a restrictive one and all such modifications are intended to be included within the scope of the present technology. Accordingly, the scope of the technology should be determined by the generic embodiments described and their legal equivalents rather than by merely the specific examples described above. For example, the steps recited in any method or process embodiment may be executed in any appropriate order and are not limited to the explicit order presented in the specific examples. Additionally, the components and/or elements recited in any system embodiment may be combined in a variety of permutations to produce substantially the same result as the present technology and are accordingly not limited to the specific configuration recited in the specific examples.

Benefits, other advantages and solutions to problems have been described above with regard to particular embodiments. Any benefit, advantage, solution to problems or any element that may cause any particular benefit, advantage or solution to occur or to become more pronounced, however, is not to be construed as a critical, required or essential feature or component.

The terms "comprises," "comprising," or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present technology, in addition to those not specifically recited, may be varied or otherwise particularly adapted to specific environments, manufacturing specifications, design parameters or other operating requirements without departing from the general principles of the same.

The present technology has been described above with reference to an exemplary embodiment. However, changes and modifications may be made to the exemplary embodiment without departing from the scope of the present technology. These and other changes or modifications are intended to be included within the scope of the present technology.

The invention claimed is:

1. A therapeutic soaking system for dispersing therapeutic constituents into a body of liquid, comprising:
- a reservoir;
- a main inlet in fluid communication with the reservoir;
- a main liquid conduit configured to receive a main flow of liquid from the main inlet;
- a pump in fluid communication with the main liquid conduit and configured to regulate a flow rate of the main flow of liquid out of the reservoir;
- a venturi injector configured to receive a first portion of the main flow of liquid from the pump;
- an ultrafine bubble generator configured to receive the first portion of the flow of liquid from the venturi injector;
- a main return configured to dispense the first portion of the flow of liquid from the ultrafine bubble generator into the reservoir;
- a nitric oxide dispensing system in fluid communication with the pump, wherein the nitric oxide dispensing system comprises:
  - a compartment for receiving a nitric oxide releasing composition; into the compartment;
  - a valve coupled downstream from the first inlet for regulating an incoming flow of the second portion of the liquid; and
  - at least one outlet for expelling a nitric oxide infused liquid into the reservoir, wherein the nitric oxide dispensing system is configured to:
    - receive a second portion of the main flow of liquid from the pump; and
    - dispense the nitric oxide releasing composition into the second portion of the main flow of liquid flowing from the pump into the reservoir; and
- a mineral dispensing system in fluid communication with the pump, wherein the mineral dispensing system comprises:
  - a second compartment for receiving a mineral releasing composition:
  - a second inlet for receiving a third portion of the liquid from the pump into the second compartment;
  - a second valve coupled downstream from the second inlet for regulating an incoming flow of the third portion of the liquid; and
  - at least one second outlet for expelling a mineral infused liquid into the reservoir, and wherein the mineral dispensing system is configured to:
    - receive the third portion of the main flow of liquid from the pump; and
    - dispense the mineral releasing composition into the third portion of the main flow of liquid flowing from the pump into the reservoir.

2. The therapeutic soaking system for dispersing therapeutic constituents into a body of liquid according to claim 1, further comprising a gas injector system coupled to the venturi injector and configured to infuse a concentrated gas into the liquid to create an infused liquid.

3. The therapeutic soaking system for dispersing therapeutic constituents into a body of liquid according to claim 2, wherein the concentrated gas comprises oxygen and ozone.

4. The therapeutic soaking system for dispersing therapeutic constitutes into a body of liquid according to claim 3, wherein the ultrafine bubbles created by the ultrafine bubble generator are less than 200 nanometers.

5. The therapeutic soaking system for dispersing therapeutic constituents into a body of liquid according to claim 1, wherein:
- a molar concentration of nitrite in the liquid is between about 231 nM and 812 nM; and
- a molar concentration of nitrate in the liquid is between about 19.6 mM and 58.8 mM.

6. The therapeutic soaking system for dispersing therapeutic constituents into a body of liquid according to claim 1, further comprising a control system for controlling of the therapeutic soaking system.

7. The therapeutic soaking system for dispersing therapeutic constituents into a body of liquid according to claim 6, wherein the control system is configured to control the valve of the nitric oxide dispensing system and the second valve of the mineral dispensing system to maintain a final molar concentration of nitrite in the liquid between about 231 nM and 812 nM and a final molar concentration of nitrate in the liquid between about 19.6 mM and 58.8 mM.

8. A therapeutic soaking system for dispersing therapeutic constituents into a body of liquid contained within a reservoir, comprising:

a liquid conduit system in fluid communication with the reservoir and configured to facilitate a flow of liquid through the therapeutic soaking system, wherein the liquid conduit system comprises:

a series of liquid conduits;

a pump configured to provide a main flow of liquid into a first liquid conduit;

a nitric oxide dispensing system in fluid communication with the pump, wherein the nitric oxide dispensing system is configured to:

receive a second portion of the main flow of liquid from the pump through a second liquid conduit; and dispense a nitric oxide releasing composition into the reservoir; and a mineral dispensing system in fluid communication with the pump, wherein the mineral dispensing system is configured to:

receive a third portion of the main flow of liquid from the pump through a third liquid conduit; and dispense a mineral releasing composition into the reservoir.

9. The therapeutic soaking system according to claim 8, further comprising an ultrafine bubble generator in fluid communication with the pump and configured to receive a first portion of the main flow of liquid from the pump through the first liquid conduit.

10. The therapeutic soaking system according to claim 9, wherein the ultrafine bubble generator comprises a gas injector system configured to create ultrafine bubbles in the first portion of the main flow, wherein the ultrafine bubbles are less than 200 nanometers in size.

11. The therapeutic soaking system according to claim 10, further comprising a venturi injector configured to infuse a concentrated gas into the first portion of the main flow of liquid to create an infused liquid.

12. The therapeutic soaking system according to claim 11, wherein the concentrated gas comprises oxygen and ozone.

13. The therapeutic soaking system according to claim 8, wherein the nitric oxide dispensing system comprises:

a compartment for receiving the nitric oxide releasing composition;

an inlet for receiving the second portion of the liquid from the pump into the compartment;

a valve coupled downstream from the inlet for regulating an incoming flow of the second portion of the liquid; and at least one outlet for expelling a nitric oxide infused liquid into the reservoir.

14. The therapeutic soaking system according to claim 8, wherein:

a molar concentration of nitrite in the liquid is between about 231 nM and 812 nM; and a molar concentration of nitrate in the liquid is between about 19.6 mM and 58.8 mM.

15. A method for dispersing therapeutic constituents into a reservoir holding a body of liquid, comprising:

pumping a main flow of liquid from an inlet in fluid communication with the reservoir;

pumping a first portion of liquid from the main flow through a first liquid conduit coupled to a venturi injector and ultrafine bubble generator in fluid communication with the reservoir;

pumping a second portion of liquid from the main flow through a second liquid conduit coupled to a nitric oxide dispensing system in fluid communication with the reservoir, wherein the nitric oxide dispensing system is configured to dispense a nitric oxide composition into the reservoir;

pumping a third portion of liquid from the main flow through a third liquid conduit coupled to a mineral dispensing system in fluid communication with the reservoir, wherein the mineral dispensing system if configured to dispense a mineral composition into the reservoir.

* * * * *